March 20, 1951     J. T. SNOREN     2,546,112
STEAM DISTRIBUTING SYSTEM FOR LOCOMOTIVES
Filed Sept. 16, 1946     7 Sheets-Sheet 1

FIG. 1.

*INVENTOR.*
JOHN T. SNOREN
BY
ATTORNEY

March 20, 1951      J. T. SNOREN      2,546,112
STEAM DISTRIBUTING SYSTEM FOR LOCOMOTIVES
Filed Sept. 16, 1946      7 Sheets-Sheet 2

FIG. 2.

*INVENTOR.*
JOHN T. SNOREN
BY
ATTORNEY

March 20, 1951 J. T. SNOREN 2,546,112
STEAM DISTRIBUTING SYSTEM FOR LOCOMOTIVES
Filed Sept. 16, 1946 7 Sheets-Sheet 3

INVENTOR.
JOHN T. SNOREN
BY
ATTORNEY

March 20, 1951  J. T. SNOREN  2,546,112
STEAM DISTRIBUTING SYSTEM FOR LOCOMOTIVES
Filed Sept. 16, 1946  7 Sheets-Sheet 4

INVENTOR.
JOHN T. SNOREN
BY
ATTORNEY

March 20, 1951 J. T. SNOREN 2,546,112
STEAM DISTRIBUTING SYSTEM FOR LOCOMOTIVES
Filed Sept. 16, 1946 7 Sheets-Sheet 6

INVENTOR.
JOHN T. SNOREN
BY
ATTORNEY

March 20, 1951  J. T. SNOREN  2,546,112
STEAM DISTRIBUTING SYSTEM FOR LOCOMOTIVES
Filed Sept. 16, 1946  7 Sheets-Sheet 7

INVENTOR.
JOHN T. SNOREN
BY
ATTORNEY

Patented Mar. 20, 1951

2,546,112

UNITED STATES PATENT OFFICE 2,546,112

STEAM DISTRIBUTING SYSTEM FOR LOCOMOTIVES

John T. Snoren, St. Paul, Minn.

Application September 16, 1946, Serial No. 697,180

8 Claims. (Cl. 121—124)

My invention relates to an automatic steam control for operating locomotives designed to control the distribution of steam to the pistons in the cylinders on each side of the locomotive by means of adjustable intake and exhaust valves positioned in separate chambers and adapted to be automatically adjusted as to the operation and operated through a transmission which is driven from one of the driving wheels of the locomotive.

A feature resides in providing two comparatively small valve chambers, one acting as a live steam chamber and the other an exhaust chamber. These chambers are located adjacent to each other and are connected by saddles extending over the same to provide the passageway for carrying the exhaust steam to the stack.

It is a feature to provide piston valve members which are double ported to provide a short valve movement and separate chambers for inlet and exhaust steam with separate double ported valves therein. This eliminates the intereference between the intake and exhaust valve functions to provide a clear passageway for the intake steam to the pistons of the cylinders as well as a separate port and clear passageway for the exhaust steam. Thus back pressure is virtually eliminated and a more sensitive control is provided for the pistons of the cylinders.

A primary feature resides in providing means for distributing and controlling the steam for the boiler of the locomotive to the pistons and cylinders which operate the drive wheels of the same. Heretofore when a locomotive is operating at a high speed a large quantity of steam is wasted or used up and the purpose and function of my invention is to control and distribute the steam from the boiler of the locomotive in a unique manner without impairing the full efficiency in the operation of the locomotive. This I accomplish by automatically regulating the position of the intake valve in the steam line from the boiler as well as regulating the exhaust valves in same ratio with the inlet valves and the movement of the piston in the cylinders.

It is a feature to provide automatic valve controlling means regulated through a transmission leading from a driving axle of the locomotive and extending through a drive shaft to a transmission provided with gear means driven by the driving shaft to reciprocate the valves in the respective intake and exhaust chambers in proper ratio to the speed of the drive wheels.

It is also a feature to provide means operated either by hand or by air or any other suitable means whereby the relative position of the intake and exhaust valves may be changed at will by the engineer while the locomotive is running.

My invention provides means for the engineer to change the position of the respective valves at will to regulate the introduction of the steam and the period of introduction into the cylinders of the locomotive as well as regulating the exhaust steam. The regulation of the intake and exhaust valves is accomplished by a unitary means which regulates the position of the respective valves in synchronism.

I provide a reversing feature for the valve gears consisting of a shaft of sufficient length to reach to either side of the locomotive in line with the valve chambers. I also provide a short shaft of sufficient length to reach between both exhaust valve chambers from one side to the other of the locomotive. The center sections of these shafts are enlarged considerably in their cylindrical dimension to permit the formation therein of four helical grooves. The grooves are evenly placed apart and extend the full length of the center sections of the shafts. The long and short shafts are supported in the transmission which is mounted on the frame of the locomotive. The shafts are supported parallel and adjacent to each other so that they can be controlled in the setting of the respective valves which they operate by the grooves milled in the enlarged portions of these shafts. Sleeves are provided to extend over the milled portions of the respective shafts. The sleeves being about twice the length of the center enlarged portion. On the center line of these sleeves (measuring lengthwise) are mounted four studs extending through the sleeve and engaging the four grooves in the shaft. A horizontal movement of these sleeves gives a rotary movement to the two crank shafts which operate the valves furnishing the means to reverse the engine, and gives sufficient rotary movement forward to change the angular advance of the steam valves. The grooves in the center section of the exhaust shaft are milled to a 45 degree pitch for a little over one half in length, then the pitch of the groove changes to about a 40 degree pitch for the balance of the length of the groove. This provides the control of the exhaust release when running with various short cut-offs.

The transmission with the steam and exhaust shafts which extend transversely to the frame of the locomotive is supported as a unit by a steel cradle which is bolted to the frame of the locomotive. The sleeves on the respective steam and exhaust shafts are mounted to slide horizontally in the adjustment of the steam and exhaust valves. I provide bearings located in the center of the cradle which are spaced to accommodate the long hubs of the spur gears mounted on the sleeves by means of the key-ways. The exhaust sleeve carrys the spur gear. The steam sleeve carries a combined spur and beveled gear.

The main drive shaft forming one of the driving axles is made with an ordinary number of splines or key-ways on the lower end to provide free sliding, to take and give with vertical movements of the engine drive shaft and driving wheels. The odd number of key-ways will simplify the dropping of the driving wheels in case of driving box trouble and will not throw the gear out of adjustment when the drivers are replaced in the locomotive frame.

It is a feature to provide a transmission having parallelly extending shafts which are supported in a suitable housing which in turn is cradled between the frame members of the locomotive and positioned adjacent the intake and exhaust chambers. This unitary transmission is operated by the drive shaft from one of the axles on which the locomotive drives are mounted, thus a rotary driving movement is provided from the driving wheel to the transmission which is adapted to operate and regulate the setting of the intake and exhaust valves. This transmission also operates the intake and exhaust valves in proper ratio with the driving wheels of the locomotive.

It is also a feature to provide the transmission with means for changing the position of the intake and exhaust valves while the locomotive is running. Thus the feeding of steam to the locomotive cylinders can be cut-off at predetermined points by simply regulating the transmission which automatically controls the operation of the valves. The operation of changing the intake and exhaust valves is synchronized so that when the intake valves are automatically changed the exhaust valves will be simultaneously changed in the same ratio to function in the most efficient manner.

A feature of primary importance of my invention resides in the automatic regulation of the respective intake and exhaust valves while the locomotive is running. This regulation of intake and exhaust valves permits the engineer to direct steam to the cylinders which operate the drive wheels to cause the piston to travel a full stroke under a full pressure of steam from the locomotive boiler for the full distance of travel of the piston in the cylinder when the engine is starting and it is operating under a heavy torque. After the locomotive has obtained its running speed (or maximum speed) for its operation, the engineer can cut-off the steam from the boiler to the piston so that the boiler pressure will be directed to the respective sides of the piston for only a portion of its stroke thereby economizing in the use of steam and overcoming back pressure in the cylinders and exhaust ports. This permits the locomotive engine to operate more efficiently because it is not retarded in its operation by the tremendous back pressure like when the locomotive is traveling at high speed (and economizing in the use of steam) because the full pressure of steam is needed for the full stroke of the piston. It will therefore be apparent that it is of primary importance to economize on steam in a locomotive providing the efficient operation of the locomotive is not impaired. This I accomplish by my system of controlling the steam to the operating cylinders of the locomotive. With my system of control of the steam when the locomotive of the old type is traveling at high speeds, a heavy back pressure is built up in the cylinders and the exhaust ports and passageways which retards the efficient operation of the locomotive. This undesirable affect I overcome by shutting off the pressure of steam to the piston at a predetermined point before the piston has reached its full travel in the cylinder in each stroke. I rely on the expansion of the steam in the cylinder against the piston to carry the piston the full stroke in high speeds. The result of my system is a large saving of steam as well as virtually overcoming the objectional back pressure in the cylinders when the locomotive is running in high speed. My system permits the engineer to instantly control the steam to the cylinders by adjusting the valves in the intake steam chamber and simultaneously adjusting the valves in the exhaust chamber so that a full load of steam may be directed against the piston heads when the locomotive is operating with heavy torque such as when it is starting.

These features together with other details and objects of primary importance will be more fully and clearly hereinafter set forth in the drawings forming part of the specification.

The drawings illustrate diagrammatically the drive wheel 10 of the locomotive which is supported by the frame 11. The drive shaft 12 is connected to the drive wheel 10 of the locomotive and is supported in the ordinary manner by the longitudinally extending frame members 11 shown in Figures 1 and 2. The drawings illustrate only one of the driving wheels 10 of the locomotive and they show only a portion of the frame of the locomotive so that the respective parts of my invention may be identified as may be required to describe the functions and operation of my invention in the control of the steam from the locomotive boiler to the respective cylinders 13 located on either side of the longitudinal frame members 11 (only one of the cylinders being illustrated in the drawings).

The drive wheel 10 is connected to the cross head 14 by the driving rod 15 and the cross head connects with the piston 16 through the piston rod 17.

A feature resides in providing a pair of small cylinders 18 and 19 respectively located directly above and connected to the cylinders 13. The cylinder 18 is for the intake steam from the boiler and is provided with an intake passageway 20 while the cylinder 19 provides the exhaust chamber and is located adjacent the intake cylinder 18. The exhaust cylinder is formed with an outlet passageway 21 which leads into the exhaust passageway of the smokestack of the locomotive (not illustrated in the drawings). The saddles 22 connect the cylinder 13 with the respective steam intake cylinder 18 and exhaust cylinder 19.

The cylinders 18 and 19 are provided with dual ported openings to give a fast action to the injection of steam to the piston 16 and to relieve the exhaust steam from the cylinder 13 through the exhaust intake chamber. These dual ported openings 23 are adapted to be opened and closed by the dual reciprocating piston valves 24 in the intake cylinder 18 and the dual ported openings 25 are adapted to be opened and closed by the dual reciprocating piston valves 26 in the exhaust cylinder 19 positioned adjacent the intake cylinder 18.

Thus I provide separate intake steam cylinders 18 for each of the cylinders 13 and separate exhaust cylinders 19 for said cylinders 13. Thus I provide a clear passageway for the intake steam and a clear passageway for the exhaust steam. Furthermore the dual ports and piston valves reduce the length of travel of the valves and at the same time I provide the necessary port openings to introduce the live steam into the cylinders 13 and to permit the exhaust steam to be quickly passed out of the cylinder and thereby overcoming back pressure in the cylinder 13 in the operation of the pistons therein.

A primary feature of my invention resides in providing a transmission for operating the intake and exhaust valves in the respective cylinders 18 and 19 and to automatically adjust the position of the respective valves in said cylinders while the locomotive is running. This provides a means of controlling the period during which steam is introduced against the piston 16 in the cylinder 13 so as to automatically change the length of time during which live steam from the locomotive boiler is introduced against the piston 16. Thus shortening the period during which a full load of steam is directed against the piston 16 when the locomotive is operating at high speed and to lengthen the period to the full stroke (if desired) during the time when the locomotive is starting or is under a heavy pull when it is necessary to direct a full load of steam against the pistons throughout the major portion of the stroke of the piston. With my system wherein I control the period of time that the full load of steam is directed to the piston of the cylinders 13, the locomotive may be operated more economically owing to the saving of steam and yet not impairing the efficient operation of the locomotive. With my system, when a heavy torque requires a full load of steam, I automatically provide such a load of steam to the cylinders and when the locomotive reaches its running speed the period of time that the full load of steam is directed against the piston is cut down in proportion to the speed of travel of the locomotive and thus a great economy of steam is accomplished together with the overcoming of a heavy back pressure of the exhaust steam escaping from the cylinders.

Figure 1:
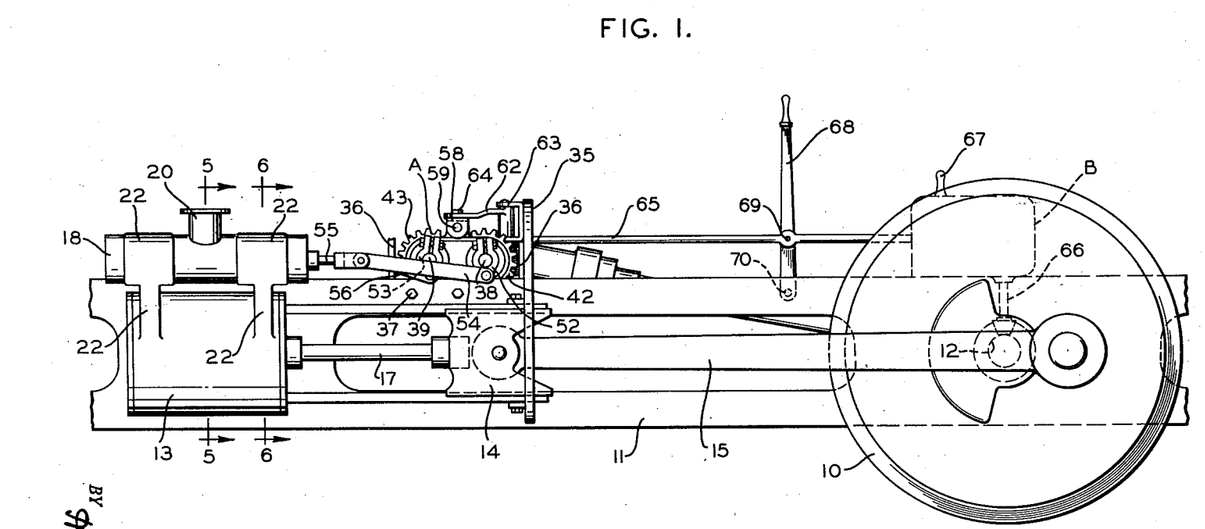
Figure 1 is a diagrammatical side view of a portion of a locomotive illustrating one of the driving wheels in connection with the operating piston and the valve chamber above the piston chambers.
Figure 2:
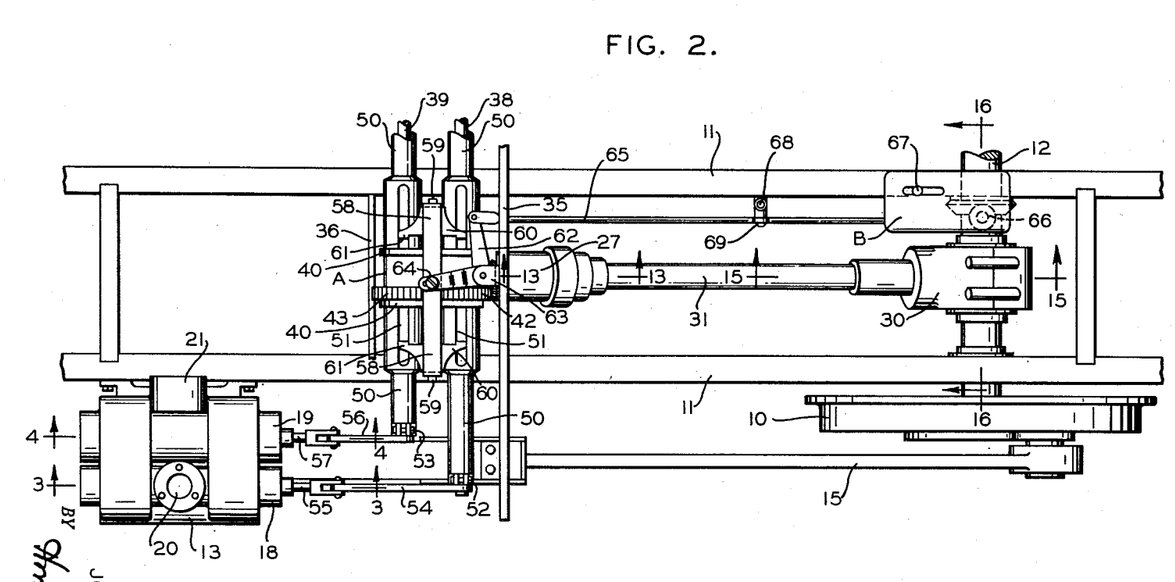
Figure 2 is a diagrammatical plan view of a portion of a locomotive showing one of the operating cylinders with the pair of intake and exhaust chambers above the same and showing the manner in which the driving means from one of the drive shafts is transmitted to the transmission for operating the intake and exhaust valves.
Figure 7:
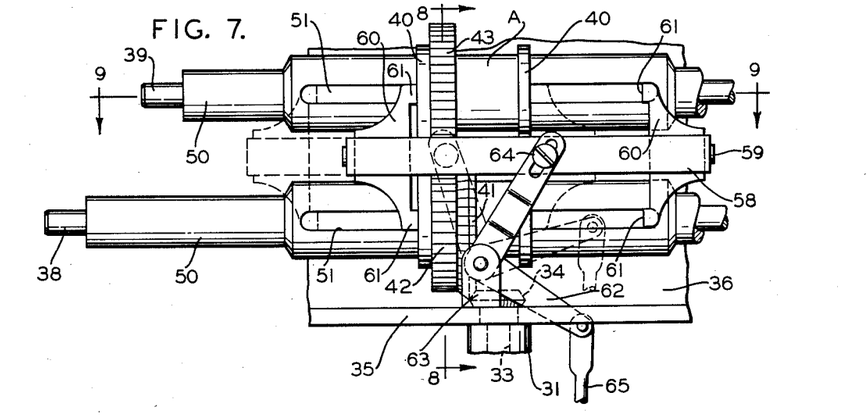
Figure 7 is a plan detail of the valve operating transmission.

To carry out my steam distribution system for locomotives, I provide the locomotive with rotary driving means which includes a drive shaft 28 which is operated by the drive shaft 12 through the beveled gears 29 which are inclosed within the casing 30 as shown in Figure 2. The drive shaft 28 extends through the hollow tubular casing 31 and connects through the universal joint 32 with the jack shaft 33. The jack shaft 33 is provided with a beveled gear 34 on the end extending into the transmission and the shaft 33 extends through the sleeve 27 which in turn is connected to the cross brace 35 which is supported to the frame 11 of the locomotive. The transmission is adapted to be inclosed by a housing (not illustrated in the drawings) and a steel cradle 36 is connected to the cross brace on one end and the ends of the same are connected by the bolts 37 to the locomotive longitudinally extending frame members 11. The cradle is partly broken away in Figure 7 and Figure 1 shows the bolt conection 37 supporting the ends of the cradle to the frame members 11. The transmission A is provided with two main parallelly extending shafts 38 and 39. These shafts 38 and 39 are supported to the cradle frame at the center by the brace members 40 which extend up from the bottom of the cradle 36 to support the shafts 38 and 39 centrally between their ends.

The beveled gear 34 from the drive shaft 28 operates the bevel gear 41 mounted on the transmission shaft 38 whereby the drive shaft 28 operates the transmission shaft 38 and by the connecting spur gears 42 and 43 on the shafts 38 and 39 respectively the two shafts 38 and 39 are operated in unison from the rotary drive shaft 28.

Figure 10:
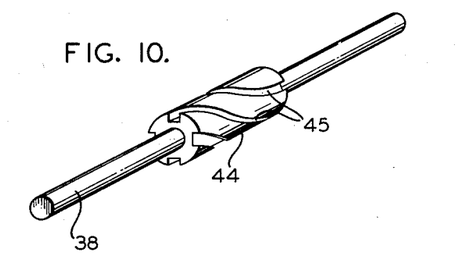
Figure 10 is a perspective view of the shafts in the valve operating transmission showing the spirally cut grooves in the center portion of the same.

In Figure 10 I have illustrated the transmission shaft 38 in perspective which is virtually identical to the shaft 39 excepting the shaft 38 is longer than the shaft 29 the purpose which will be hereinafter set forth. The shafts 38 and 39 are formed with a central enlarged cylindrical portion 44 which is formed with helical grooves 45 through their length. The grooves 45 in the center section of the exhaust shaft are milled to approximately a 45 degree pitch for a little over one half the length of the grooves, then the pitch of the grooves changes to about a 40 degree pitch for the balance of the length of the grooves. This provides the control of the exhaust release when running with various short cut-offs.

Figure 11:
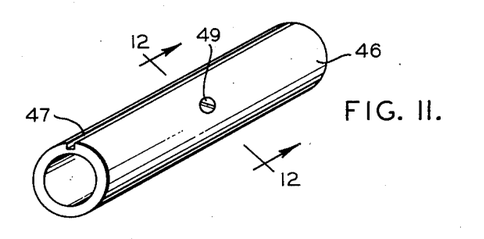
Figure 11 is a perspective view of one of the sleeves which fits over the spirally grooved portion of the shaft shown in Figure 10.
Figure 12:
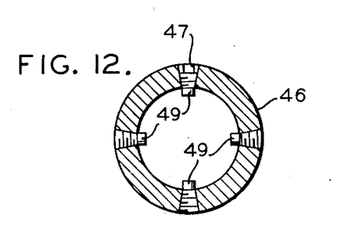
Figure 12 is a section on the line 12—12 of Figure 11 showing the screw studs positioned in the sleeve and projecting in a manner to engage in the spirally formed grooves in the shaft, which shaft is shown in Figure 10.
Figure 13:
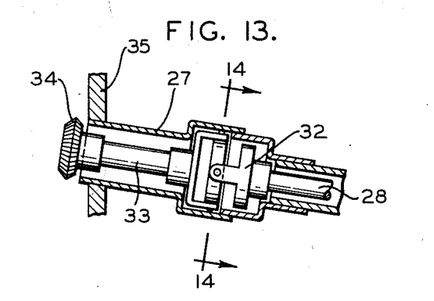
Figure 13 is a detailed section through a portion of the driving shaft which operates the valve controlling transmission and taken on the line 13—13 of Figure 2.
Figure 14:
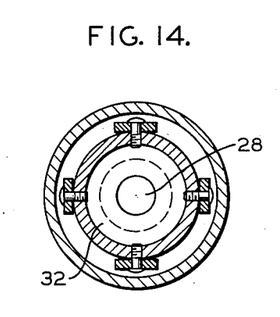
Figure 14 is a section on the line 14—14 of Figure 13.
Figure 15:
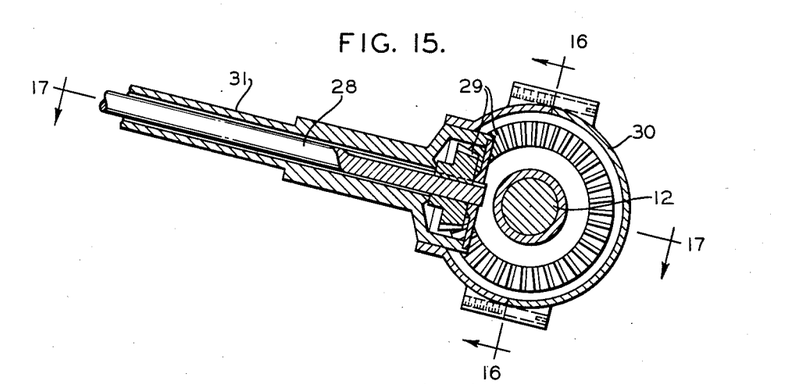
Figure 15 is a detailed section of the drive shaft showing the connection with the driving axle of the locomotive and taken on the line 15—15 of Figure 2.
Figure 16:
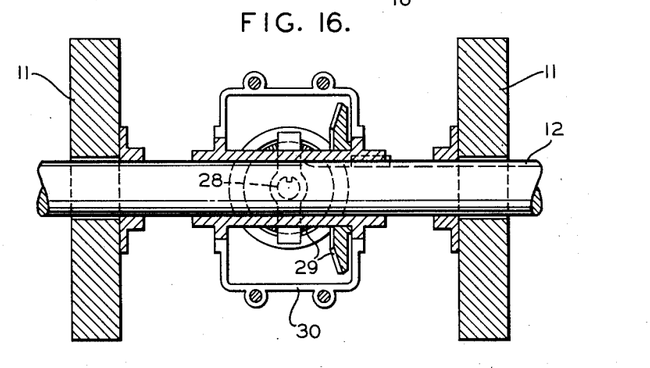
Figure 16 is a detail partly in section taken on the line 16—16 of Figures 15 and 2.
Figure 17:
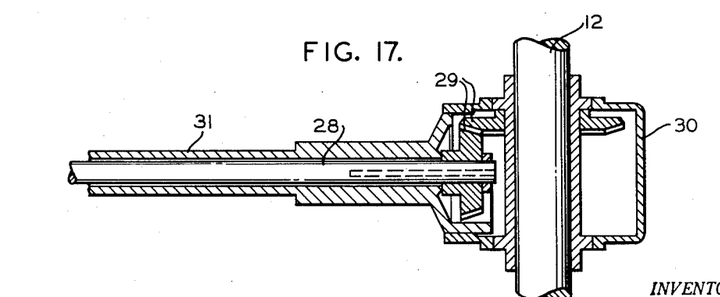
Figure 17 is a section on the line 17—17 of Figure 15.

The transmission includes a pair of cylindrical sleeves 46 illustrated in perspective in Figure 11 there being two of these sleeves; one over the enlarged portion 44 of the shaft 38 and one over the enlarged portion of the shaft 39. The sleeves 46 are provided with longitudinal key-ways 47 which provide the means of fixing the gears 42 and 43 to the sleeves 46 by means of the keys 48. Each of the sleeves 46 are provided with screw studs 49, the inner ends of which project into the grooves 45. Thus when the gears 42 and 43 are rotated by the drive shaft 28 the studs 49 will engage the grooves 45 and cause the respective shafts 38 and 39 to rotate.

The ends of the shafts 38 and 39 are covered by the housing sleeves 50 which are formed with open longitudinal slots 51, the purpose of which will be hereinafter set forth.

I provide short crank arms 52 and 53 which are secured to the ends of the shafts 38 and 39. The crank arms 52 are connected by the links 54 to the piston rods 55 of the intake cylinders 18 on either side of the locomotive (only one side of the locomotive being illustrated). The crank arms 53 on each end of the shaft 39 of the transmission A are connected to the short link 56 which connects with the piston rod 57 of the exhaust cylinder 19.

Figure 3:
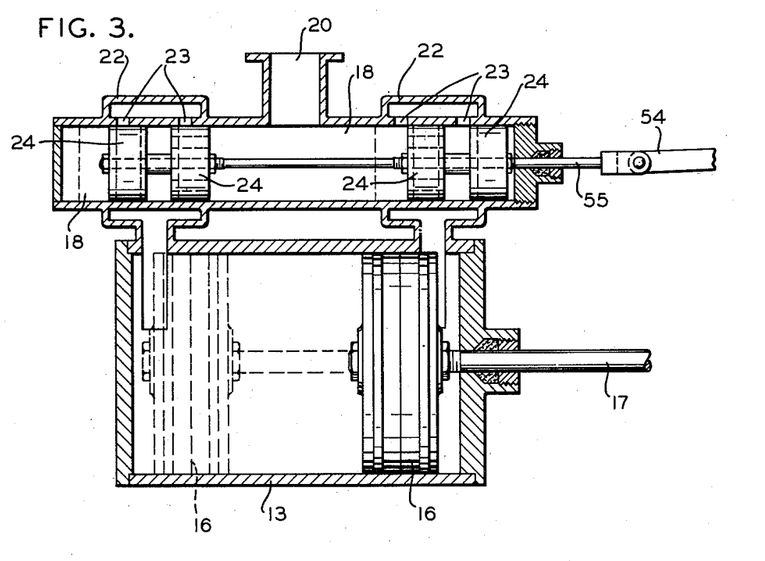
Figure 3 is a detail section through the operating cylinder showing the piston and the piston valves in the intake cylinder which section is taken on the line 3—3 of Figure 2.
Figure 4:
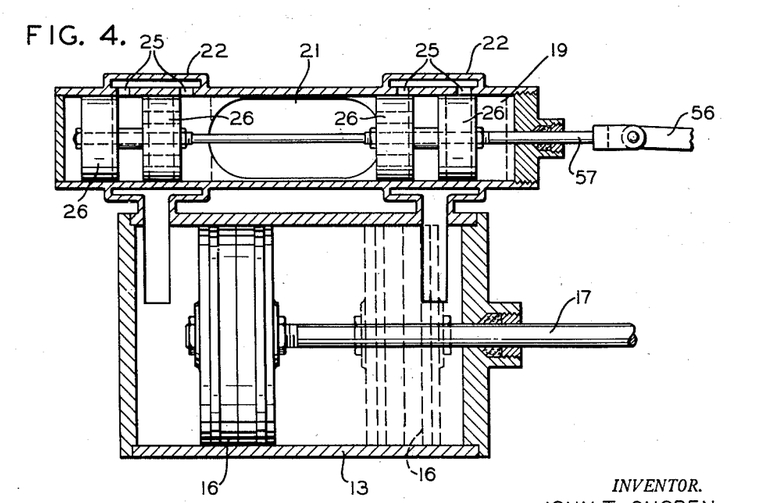
Figure 4 is a similar section to Figure 3 taken on the line 4—4 of Figure 2 and illustrating the exhaust chamber with the piston valves therein.
Figure 5:
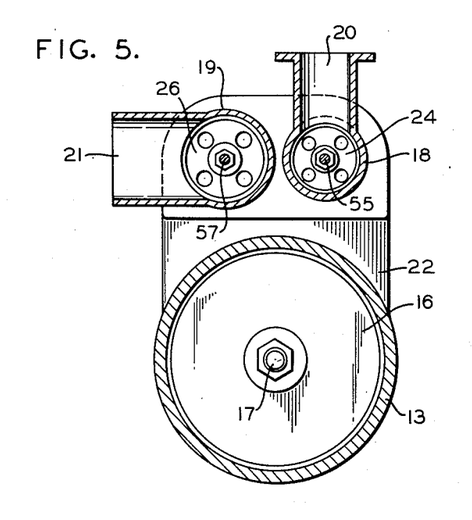
Figure 5 is a section on the line 5—5 of Figure 1.
Figure 6:
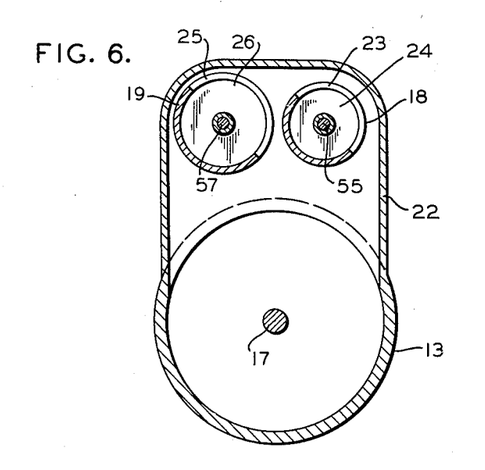
Figure 6 is a section on the line 6—6 of Figure 1.

The piston rod 55 supports the twin pistons reciprocatable in the ends of the intake cylinder 18 whereas the piston rod 57 supports the twin pistons 26 reciprocatable in the exhaust cylinder 19 as illustrated in Figures 3 and 4.

Figure 8:
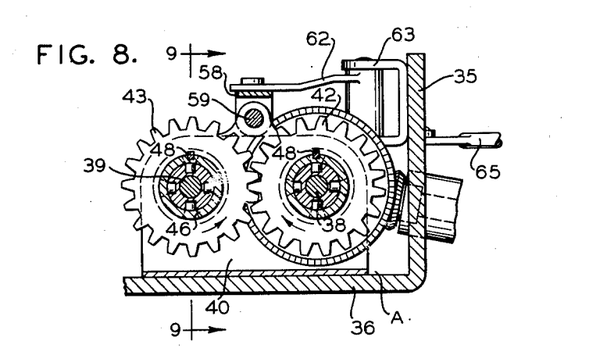
Figure 8 is a section on the line 8—8 of Figure 7.
Figure 9:
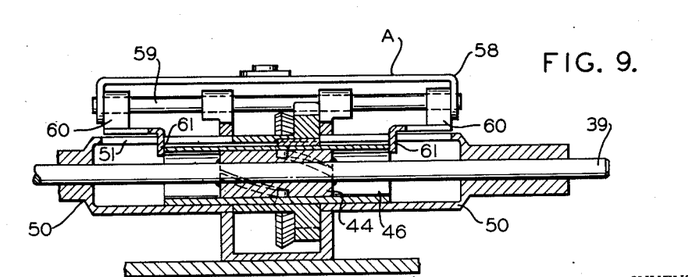
Figure 9 is a section on the line 9—9 of Figures 7 and 8.

A primary feature of my invention resides in providing means for rotating the shafts 38 and 39 by an adjusting means which includes the slidable yoke bar 58 which is supported on the ends of the shaft 59; illustrated primarily in Figures 7, 8 and 9. Below the ends of the yoke bar 58 and mounted on the ends of the shaft 59, I provide a pair of brackets 60 which have depending fingers 61 adapted to enter the slots 51. The depending fingers 61 reciprocate in the slots 51 and are adapted to engage against each end of the sleeves 46. Therefore, by moving the yoke bar 58 back and forth the sleeves 46 will slide longitudinally in the housing 50 which incloses the ends of the shafts 38 and 39. When the sleeves 46 are moved longitudinally, the studs 49 will travel in the spiral grooves 45 tending to rotate the shafts 38 and 39 in synchronism. This rotation of the shafts 38 and 39 rotates the short crank arms 52 and 53 to move the twin pistons 24 and 26 in the intake and exhaust cylinders 18 and 19 in relation to the ports 23 and 25 in the respective intake and exhaust cylinders 18 and 19. This movement of the pistons in the intake and exhaust cylinders will lengthen or shorten the period of injecting pressure steam into the intake cylinder and will simultaneously adjust the exhaust pistons to properly exhaust the steam out of the work cylinder 13.

I provide a bell crank arm 62 mounted on the bracket 63 which is slidably connected at 64 to the yoke bar 58 on one end of the bell crank arm while the other end of the bell crank arm 62 is connected by the adjusting rod 65 which is connected to the automatic governor B. The governor B may be of any suitable construction and is adapted to be operated from the driving axle 12 or from any other suitable rotating part of the locomotive to rotate the governor by the shaft 66, in accordance with speed of travel of the locomotive. The governor B may be of any suitable construction and is only diagrammatically illustrated. The governor may be disconnected or released from the operating rod 65 by the releasing lever 67. I also provide a hand operating lever 68 for operating the rod 65. The lever 68 is connected at 69 to the rod 65 and is pivotly connected on the bottom at 70.

The operating lever 68 is located in the engineer's cab where he has free access to the same as well as the governor B. When the engineer wishes to manually operate the adjusting of the transmission A to adjust the relative position of the short cranks 52 and 53, he may use the hand lever 68 after he has released the lever 67 to release the governor from the operation of the rod 65. Thus the engineer may operate the transmission A to adjust the position of the twin piston in the intake and exhaust cylinders when the locomotive is standing still or when it is running. If, however, the engineer wishes to put the operation of the adjustment of the pistons in the intake and exhaust cylinders on the automatic control, namely, the governor B; he releases his hand from the hand lever 68 and moves the lever 67 to cause the governor B to automatically operate the rod 65 which in turn operates the bell crank 62 and the yoke bar 58 to move the sleeves 46 which in turn rotate the respective shafts 38 and 39 to automatically position the twin pistons in the intake and exhaust cylinders while the engine is running.

Therefore, it is apparent that I provide a unique and novel means of automatically adjusting the intake and exhaust valves for the work cylinders so that when the engine is running the governor B will automatically control the position of the intake and exhaust pistons.

With my system of distributing steam to the work cylinders of the locomotive, I provide a means of carrying the high pressure steam from the boiler of the locomotive right up to the intake cylinders 18. Heretofore a loss in the pressure steam line from the locomotive boiler to the work cylinders took place owing to the fact that the steam was drained from the steam line coming from the boiler to the pistons in the work cylinders by the excessive use of steam owing to the long period of injection of live steam to the pistons of the work cylinders. In my steam control system, a high pressure of steam can build right up to the intake pistons of the intake cylinders owing to the adjustment of the intake pistons for a short cut-off of steam to the work cylinders and owing to the short movement of the pistons in the intake cylinders which is accomplished by my twin piston valves and twin ports; therefore with my system the locomotive will operate more efficiently because when the steam is released by the twin pistons to the work cylinders it will be delivered at a high pressure and with a very small loss of pressure of steam from the locomotive boiler to the piston in the work cylinders.

The short cut-off means of my adjustment through the governor B of the steam to the work cylinders 13 permits a high pressure head of steam in the center of the intake cylinders between the twin piston valves which is at a point directly adjacent the working cylinders. This high pressure head of steam in the intake cylinder provides a means of getting the greatest efficiency from the work cylinders owing to the fact that high pressure may be injected into the same during a shorter period of the stroke of the pistons in the work cylinders.

Further the efficiency of the operation of the working cylinders is increased owing to the fact that the separate exhaust cylinders in the twin exhaust valves relieve the exhausting so fast that the back pressure is reduced to a minimum either in high speed or in low speed of the locomotive and by the same token the twin intake pistons and twin ports inject into the working cylinders high pressure steam in a shorter period of time and thereby cause the pistons in said cylinders to be operated more efficiently.

A further primary feature of my invention resides in the economy of steam used by the locomotive with my steam distribution system because when the locomotive is operating at high speed the cut-off of the injection of steam to the working cylinders is automatically adjusted (or adjusted by hand) to economize on steam being used in the work cylinders and at the same time reducing to a minimum the back pressure through the exhaust cylinders. Also I provide the feature of the separate intake and exhaust cylinders so that the exhaust steam does not interfere with the intake steam. Thus it is possible to carry a high pressure head of steam directly to the center of the intake cylinders.

I provide either a manual control for the engineer or an automatic governor for controlling the position of the intake and exhaust valves in their respective chambers.

In accordance with the patent statutes, I have described the principles of the operation of my steam distribution system for locomotives or similar engines while I have illustrated a particular form of construction in the drawings, I desire to have it understood that obvious changes may be made without departing from the spirit of the invention within the scope of the claims.

Heretofore locomotives have been operated with virtually a constant lead which has been a very undesirable drawback in the operation of the locomotive as it caused an unnecessary waste of steam without the efficient operation of the locomotive. With my steam distributing system for locomotives I overcome this detrimental feature in old forms of locomotives and I accomplish this by the separation of the intake and exhaust steam chambers which permits the cutting down of the steam lap to just enough to keep live steam from entering both ends of the work cylinders at the same time. This step changes the angular advance of the eccentric crank position to a lead less than 90 degrees, bringing the eccentric crank into a position of fast movement at a time when quick port opening is really necessary. Thus my system eliminates the need of any starting lead on the steam valves.

Lead as used in a steam engine is the amount of pre-admission given by the slide valve at the instant the piston is ready to commence its impulse stroke. The amount of advance depends upon the type of engine and the angular advance of the eccentrics before their cranks for operating the intake and exhaust piston valves. This means of controlling the steam from the locomotive boiler together with the means of quickly exhausting the used steam from the work cylinder by the separate exhaust chambers increases the efficiency of the operation of the locomotives and at the same time economizes the use of steam to operate the same.

I claim:

1. A steam control for locomotives including a pair of cylinders positioned adjacent the main locomotive cylinders, one of said pair of cylinders acting as the intake steam cylinder for the intake valves and the other pair of said cylinders acting as the exhaust cylinder for the exhaust valves, steam saddles connecting said pair of cylinders with the said main cylinder, piston valves in each of said pair of cylinders adapted to reciprocate therein, a transmission having parallelly disposed shafts one of which acts as the intake valve operating means and the other acting as the exhaust valve operating means including an enlarged cylindrical portion formed centrally on each of said parallelly disposed shafts, helical grooves formed in each of said enlarged cylindrical portions, a sleeve adapted to slide on each of said cylindrical portions, studs formed in each of said sleeves adapted to engage with said helical grooves, a groove formed longitudinally on the outer surface of said sleeve, finger means slidably positioned within said longitudinally formed grooves, means for moving said finger means in said longitudinal grooves to rotate said parallelly disposed shafts.

2. A system of steam distribution for locomotives in combination with the work cylinders of the locomotive, reciprocating pistons in said work cylinders, means connecting said pistons with the drive wheels of the locomotive, a rotary driving means from one of the axles of the locomotive, a transmission adapted to be driven by said driving means, a pair of rotating shafts in said transmission, separate intake and exhaust cylinders, steam saddles connecting said intake and exhaust cylinders with said work cylinders, reciprocable intake and exhaust pistons in said intake and exhaust cylinders, means connecting said piston valves in said respective intake and exhaust cylinders to said rotating shafts in said transmission and means for adjusting said connecting means operating said respective valves to govern the cut-off point of said intake and exhaust valves to lengthen or shorten the period of injection of steam to said work cylinders and the exhaust of steam therefrom.

3. A steam distribution system for locomotives in combination with the work cylinders of a locomotive including an intake steam cylinder, an exhaust steam cylinder of larger diameter than the intake steam cylinder, reciprocating piston valves in said intake and exhaust cylinders, a rotary drive means from the driving axle of the locomotive, a transmission adapted to be driven by said drive means, a pair of parallelly extending shafts in said transmission, one of said shafts having crank arms on the outer end thereof adapted to reciprocate pistons in said intake steam cylinders, and the other of said shafts having crank arms on the end thereof having reciprocating pistons in the exhaust cylinders, spiral grooves formed centrally in each of said shafts in said transmission, collars over said spirally grooved portion of said shafts, lugs extending into said grooves from said sleeves to operate in said spiral grooves in said shafts and lever means for moving said sleeves longitudinally on said shafts to rotate said shafts to change the position of said pistons in said intake and exhaust cylinders, whereby said intake pistons may be adjusted into various positions within said intake cylinders to lengthen or shorten the cut-off period during the injection of pressure steam to said work cylinders and said exhaust pistons being simultaneously adjusted with said intake pistons to change the position of the same in the same ratio that the intake pistons are changed.

4. A steam distribution system for locomotives in combination with working cylinders which operate the drive wheels of the locomotive, individual auxiliary cylinders on each work cylinder, one for the intake steam and the other for the exhaust steam, means connecting the intake and exhaust cylinders with said work cylinders, twin pistons reciprocatable in each end of said respective intake and exhaust cylinders, twin steam ports for said twin pistons, thereby providing a short movement for said twin pistons to open and close the respective twin ports in said respective cylinders, a transmission for operating said pistons in said intake and exhaust cylinders including a pair of parallelly disposed shafts, crank arms on the ends of said shafts, connecting rods from said crank arms to the piston rods of said respective intake and exhaust cylinders, drive means from the driving axle of the locomotive to rotate said transmission shafts, sleeves over said shafts in said transmission, spiral grooves formed in said shafts in said transmission, operating studs extending from said sleeves into said spiral grooves, said studs operating to rotate said pair of respective shafts in said transmission to operate said crank arms and in turn reciprocate the respective twin pistons in said intake and exhaust cylinders, and means for shifting said sleeves longitudinally on said shafts to change the relative position of the crank arms, simultaneously changing the relative position of said twin pistons to shorten or lengthen the period during which pressure steam is directed into said work cylinders, said exhaust pistons being adjusted simultaneously with the adjustment of said intake pistons.

5. A steam distribution system for locomotives in combination with the working cylinders, boiler, and throttle of a locomotive, including intake and exhaust auxiliary cylinders adjacent said work cylinders, steam passageways connecting said intake and exhaust cylinders to said work cylinders, a transmission for reciprocating the pistons in said auxiliary cylinders in synchronism, rotary drive means for operating said transmission, means for adjusting said transmission to manually adjust the position of said pistons in said intake and exhaust cylinders, means for automatically operating said pistons, adjusting means in said transmission in accordance with the speed of operation of the locomotive whereby the length of the period during which pressure steam is injected into said work cylinders may be lengthened and shortened either manually or automatically to economize in the operation of the locomotive and to permit the throttle of the locomotive to direct a high pressure steam from the boiler of the locomotive to the pistons of the intake steam cylinders and to regulate the cut-off of the high pressure steam to the work cylinders by the reciprocating movement of the pistons in the intake cylinders.

6. A steam distribution system for locomotives in combination with the locomotive steam generating boiler and the working cylinders which operate the drive wheels of the locomotive, comprising a pair of auxiliary cylinders for each working cylinder, one of said cylinders acting as the intake for the pressure steam and the other of said cylinders being larger in diameter and acting as the exhaust steam chamber, from the work cylinder, a transmission for reciprocating twin pistons reciprocatable in pairs in each end of said auxiliary cylinders for intake and exhaust steam to operate said pistons in synchronism, rotary drive means for operating said transmission, means for manually and automatically adjusting said transmission to regulate the position of said pairs of twin pistons in said respective intake and exhaust cylinders in accordance with the speed of travel of the drive wheels of the locomotive.

7. Means for controlling the distribution of steam from the locomotive boiler to the work cylinders which operate the drive wheels of the locomotive comprising separate intake and exhaust cylinders, steam saddles connecting said separate intake and exhaust cylinders to the working cylinders, pistons in said respective intake and exhaust cylinders and rotary means from the drive axle to the locomotive to the piston rods of said respective intake and exhaust cylinders adapted to reciprocate said pistons in said respective intake and exhaust cylinders in synchronism, and means for adjusting said rotary means to change the operating position of the respective pistons in said intake and exhaust cylinders in synchronism.

8. A steam control system for locomotives in combination with the work cylinders thereof including reciprocating pistons in said work cylinders, a pair of auxiliary cylinders mounted on each of said work cylinders, steam saddles connecting the ends of said auxiliary cylinders with the ends of said work cylinders, one of said auxiliary cylinders acting as a separate intake cylinder for high pressure steam and the other of said auxiliary cylinder acting as the exhaust steam cylinder, pairs of twin piston valves reciprocatable in the ends of said intake and exhaust cylinders, pairs of twin ports adapted to be opened and closed by said twin pairs of piston valves in said respective auxiliary cylinders, and means for adjusting the lead and cut-off position of said piston valves in synchronism.

JOHN T. SNOREN.

REFERENCES CITED

The following references are of record in the file of this patent:

UNITED STATES PATENTS

| Number | Name | Date |
|---|---|---|
| 786,060 | Smith | Mar. 28, 1905 |
| 831,136 | Behr | Sept. 18, 1906 |
| 1,610,528 | Metcalfe | Dec. 14, 1926 |
| 1,675,388 | Skinner | July 3, 1928 |
| 1,750,592 | Hance | Mar. 11, 1930 |
| 2,073,921 | Caracristi | Mar. 16, 1937 |
| 2,239,713 | Hathaway | Apr. 29, 1941 |
| 2,272,226 | Rossman | Feb. 10, 1942 |
| 2,321,061 | Hathaway | June 8, 1943 |